(12) United States Patent
Bendi et al.

(10) Patent No.: US 10,798,041 B2
(45) Date of Patent: Oct. 6, 2020

(54) SYSTEMS AND METHODS FOR CLASSIFICATION AND/OR TRANSMISSION OF MESSAGES

(71) Applicant: Verizon Patent and Licensing Inc., Arlington, VA (US)

(72) Inventors: Sethumadhav Bendi, Walnut Creek, CA (US); Lodema M. Steinbach, Clayton, CA (US); Susan S. Marion, Little Rock, AR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 16/045,481

(22) Filed: Jul. 25, 2018

(65) Prior Publication Data
US 2020/0036668 A1 Jan. 30, 2020

(51) Int. Cl.
*H04L 12/58* (2006.01)
*H04L 29/08* (2006.01)

(52) U.S. Cl.
CPC .............. *H04L 51/18* (2013.01); *H04L 51/12* (2013.01); *H04L 67/10* (2013.01)

(58) Field of Classification Search
CPC .......... H04L 51/18; H04L 51/12; H04L 67/10
See application file for complete search history.

(56) References Cited

U.S. PATENT DOCUMENTS

| | | | | |
|---|---|---|---|---|
| 8,046,013 B1* | 10/2011 | Zhang | ..................... | H04W 4/12 370/392 |
| 8,787,876 B1* | 7/2014 | Cazanas | .................. | H04M 3/38 455/411 |
| 2005/0141522 A1* | 6/2005 | Kadar | ..................... | H04L 51/38 370/396 |
| 2006/0148495 A1* | 7/2006 | Wilson | ..................... | H04L 51/14 455/466 |
| 2009/0111489 A1* | 4/2009 | Wilson | ..................... | H04W 4/14 455/466 |
| 2009/0125595 A1* | 5/2009 | Maes | ........................ | H04L 51/12 709/206 |
| 2010/0316023 A1* | 12/2010 | Zhang | .................... | H04W 76/12 370/335 |
| 2011/0237276 A1* | 9/2011 | Griset | ..................... | H04W 4/18 455/456.1 |
| 2011/0289164 A1* | 11/2011 | Griset | ..................... | H04L 51/38 709/206 |
| 2012/0063388 A1* | 3/2012 | Ruparelia | ............... | H04L 51/38 370/328 |
| 2012/0110641 A1* | 5/2012 | Parker | ..................... | H04L 45/06 726/4 |
| 2014/0372557 A1* | 12/2014 | Buckley | .............. | H04L 65/1006 709/217 |

(Continued)

*Primary Examiner* — Blake J Rubin

(57) ABSTRACT

A device may receive a message from a source. The device may send, to a server device, a request for classification information that identifies a classification of the message after receiving the message. The device may receive a response message to the request for the classification information after sending the request. The response message may include the classification information identifying the classification. The device may dynamically provide the message to a channel based on the classification identified by the classification information after receiving the response message.

20 Claims, 8 Drawing Sheets

(56) References Cited

U.S. PATENT DOCUMENTS

| | | | |
|---|---|---|---|
| 2015/0043453 A1* | 2/2015 | Hegarty | H04L 65/1016 370/329 |
| 2015/0281998 A1* | 10/2015 | Joly | H04W 48/14 370/235 |
| 2015/0334152 A1* | 11/2015 | Oyman | H04L 5/0092 709/219 |
| 2016/0043945 A1* | 2/2016 | Cooper | H04L 45/22 370/389 |
| 2016/0105468 A1* | 4/2016 | Mufti | H04L 65/1073 709/228 |
| 2017/0063977 A1* | 3/2017 | Jalwadi | H04L 41/0213 |
| 2017/0180303 A1* | 6/2017 | Debris | H04L 51/36 |
| 2018/0013705 A1* | 1/2018 | Neal | H04L 51/12 |
| 2018/0352391 A1* | 12/2018 | Wright | H04W 4/12 |
| 2019/0044984 A1* | 2/2019 | Chiang | H04L 65/1089 |
| 2019/0297471 A1* | 9/2019 | Baer | H04W 68/00 |
| 2019/0306095 A1* | 10/2019 | Kirisken | H04L 51/063 |
| 2019/0356617 A1* | 11/2019 | Synal | H04L 65/1006 |
| 2019/0356704 A1* | 11/2019 | Jernstrom | H04L 65/1073 |

* cited by examiner

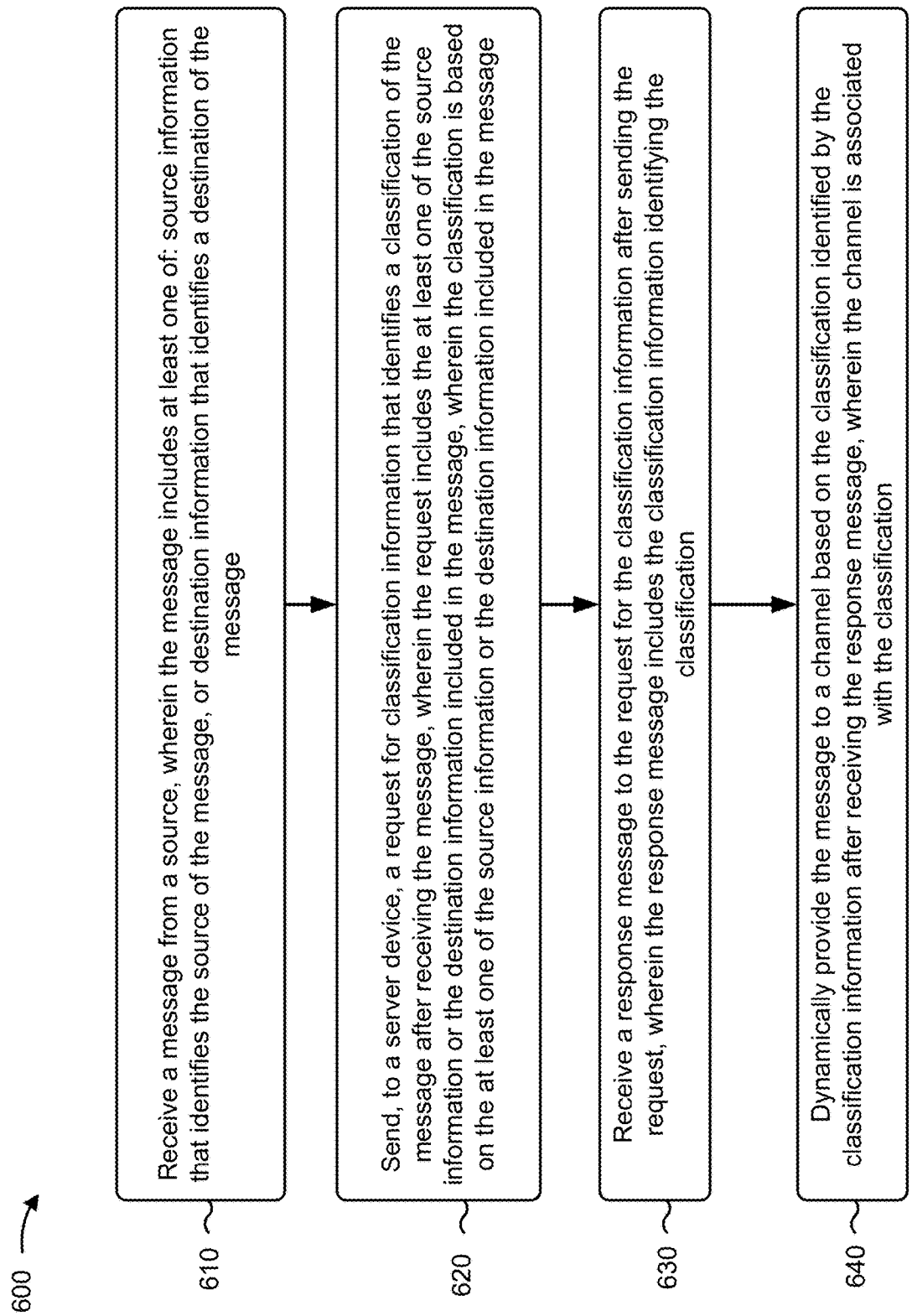

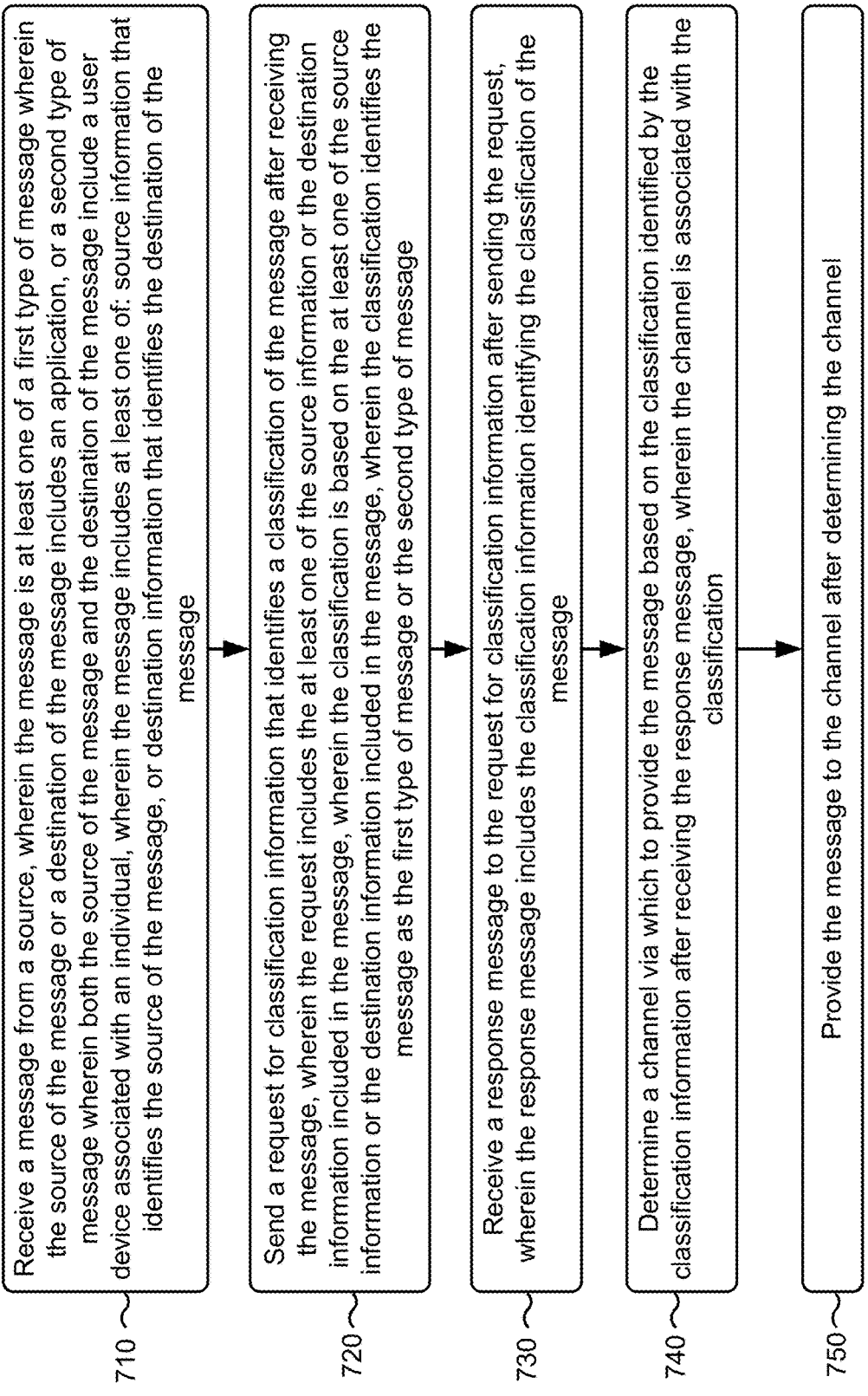

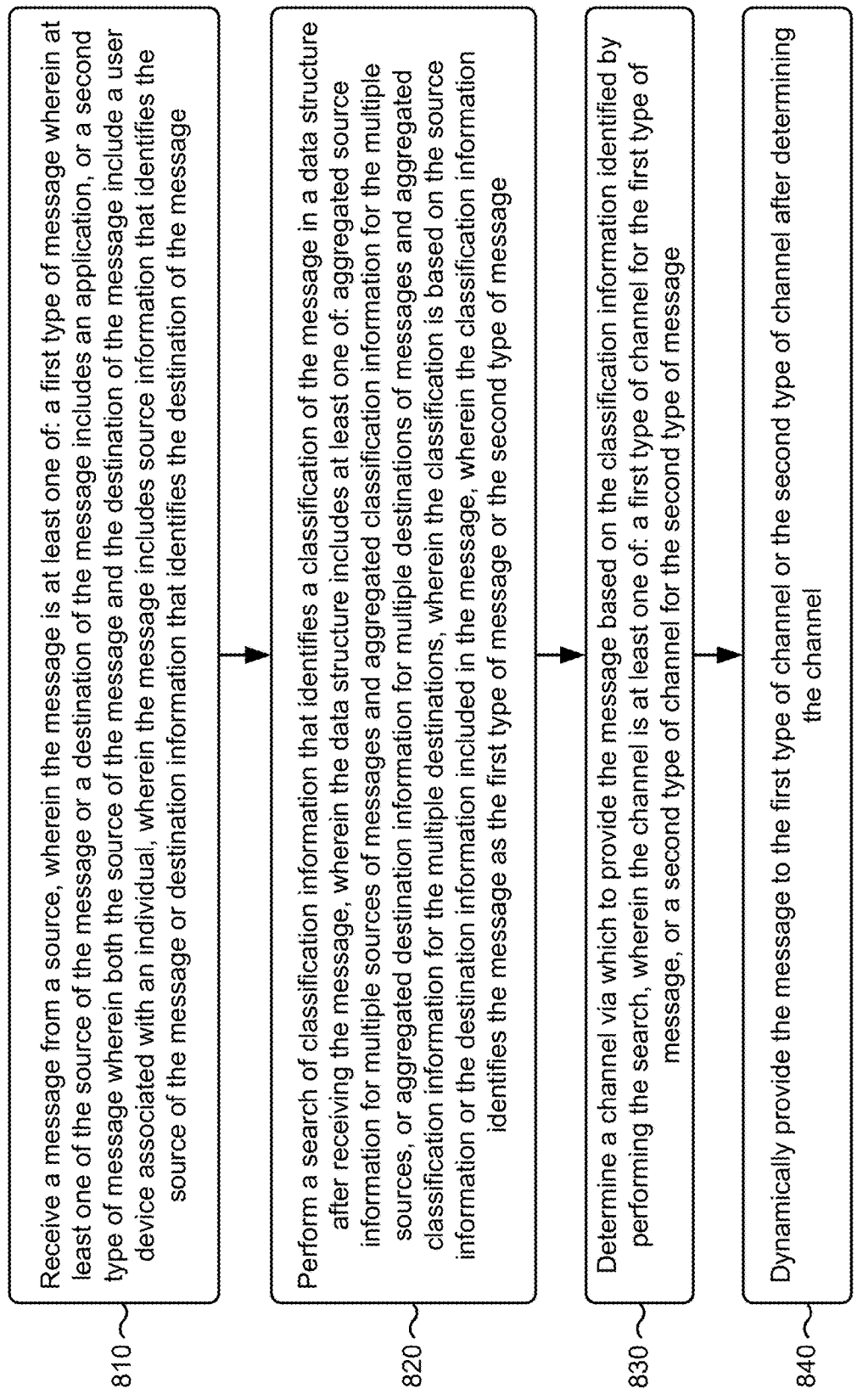

US 10,798,041 B2

SYSTEMS AND METHODS FOR CLASSIFICATION AND/OR TRANSMISSION OF MESSAGES

BACKGROUND

Application-to-person (A2P) messaging is used by organizations such as financial institutions, airlines, hotel booking sites, and/or the like to send short message service (SMS) messages from the organizations' systems to the organizations' customers. For example, these types of messages may provide customers of the organization with coupons for services, one-time access codes, and/or the like. In some contexts, a recipient of an A2P message may send a message (e.g., a person-to-application (P2A) message) to an originating system (or application associated with the system). In other contexts, one person may send a message to another person (e.g., a person-to-person (P2P) message).

BRIEF DESCRIPTION OF THE DRAWINGS

FIGS. 6-8 are flow charts of example processes for classification and/or transmission of messages.

DETAILED DESCRIPTION OF PREFERRED EMBODIMENTS

The following detailed description of example implementations refers to the accompanying drawings. The same reference numbers in different drawings may identify the same or similar elements.

Carriers (e.g., landline carriers, mobile carriers, and/or the like) may resell telephone numbers (e.g., 10-digit telephone numbers, seven-digit telephone numbers, and/or the like) to service providers (e.g., ridesharing services providers, group messaging service providers, and/or the like) for repurposed use in messaging services. In some cases, the numbers are reassigned for person-to-person (P2P) services, while in other cases, the numbers are reassigned to application-to-person (A2P) services.

A2P messages may be sent on P2P channels and may be inadvertently filtered as spam or junk messages. For example, an A2P service may send messages to hundreds, thousands, or more devices from one application in a short period of time. This behavior is commonly identified by current spam filtering controls to prevent spamming or other abuse of messaging services. Some spam filtering controls may not accommodate applications that send hundreds, thousands, or more messages in a short period of time, such as sending validation codes to subscribers of a service provided by an application, sending coupons to customers of an organization, and/or the like. This may result in an application having to re-send a message due to filtering of the message, thereby consuming processing resources of a device that hosts the application. In addition, this results in lost or delayed communications, thereby negatively impacting communications associated with a network.

Some implementations described herein provide a device (e.g., a messaging gateway) that is capable of distinguishing A2P messages (or person-to application (P2A) messages) from P2P messages. In some implementations, the device may obtain classification information to identify a message as an A2P message or as a P2P message, and may dynamically provide the message to a channel based on the classification identified by the classification information. In this way, some implementations may reduce incorrect filtering of messages (e.g., by providing the messages to a channel that is configured to provide a particular type of message). This may reduce or eliminate filtering errors by a device related to filtering messages, thereby conserving processing resources of the devices that would otherwise be consumed performing incorrect filtering. In addition, this may reduce or eliminate duplicative transmission of an erroneously filtered message or duplicative receipt of an incorrectly filtered message, thereby conserving computing resources of devices that transmit or receive the messages. Further, this may provide networks with better control mechanisms for distinguishing between A2P messages and P2P messages, thereby improving network management of different types of messages.

Figure 1:
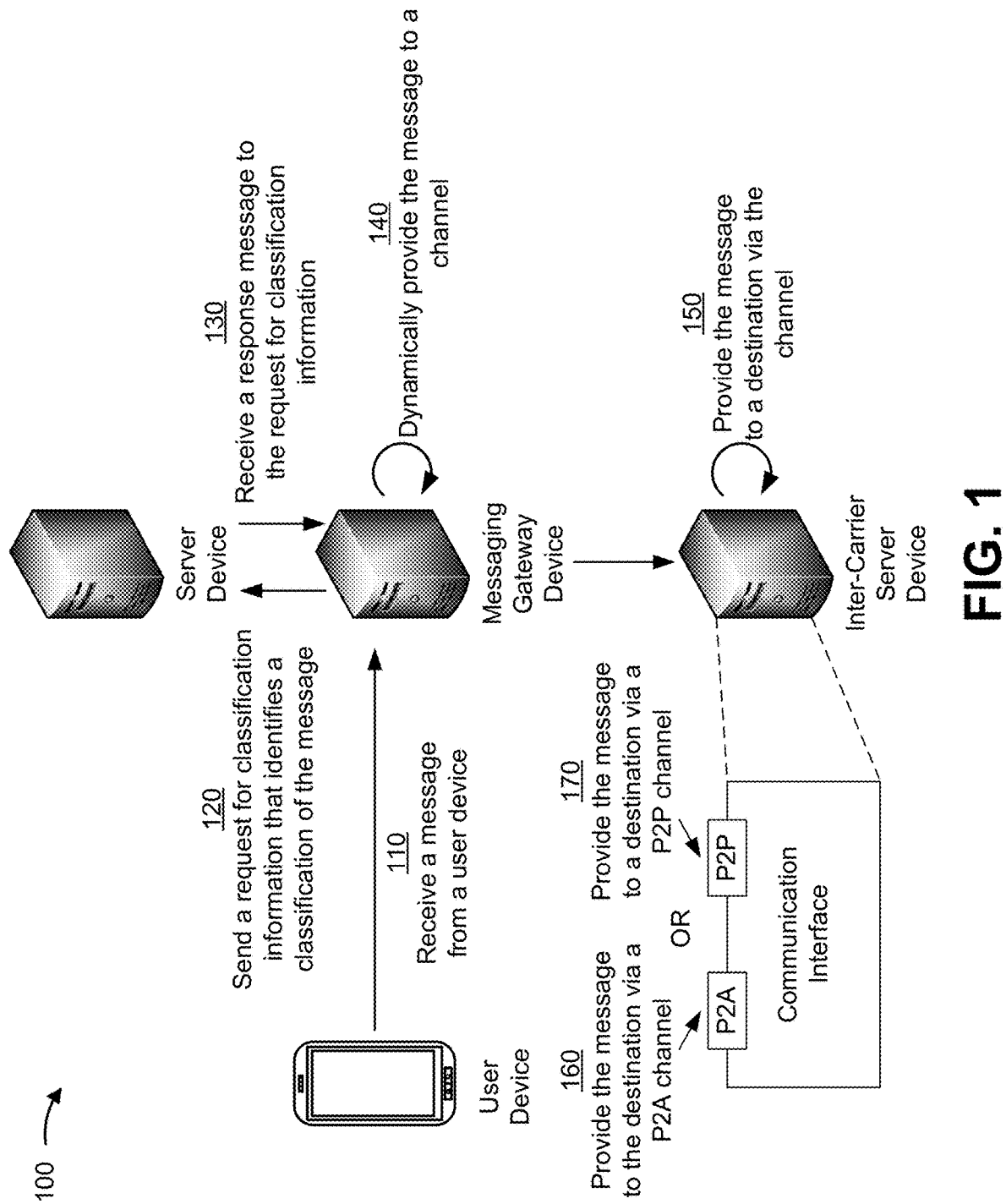
FIG. 1 is a diagram of an example implementation described herein.

FIG. 1 is a diagram of an example implementation 100 described herein. As shown in FIG. 1, implementation 100 includes a user device, a server device, a messaging gateway device, and an inter-carrier server device.

As shown in FIG. 1, and by reference number 110, the messaging gateway device may receive a message from a user device. In some implementations, the message may be a short messaging service (SMS) message, a multimedia messaging service (MMS) message, and/or the like. In some implementations, the message may include a body, such as content of the message, and metadata, such as source information that identifies a source of the message, destination information that identifies a destination of the message, and/or the like. In some implementations, the source information and/or the destination information may include a mobile directory number (MDN) of the device. Additionally, or alternatively, the source information and/or the destination information may include an international mobile subscriber identifier (IMSI), a universally unique identifier (UUID), an application identifier, and/or the like.

In some implementations, the messaging gateway device may receive a message when a user utilizes the user device to send a message to another individual using another user device (e.g., a P2P message), when an individual sends a message to an application associated with a service hosted on a server device using the user device (e.g., a P2A message), when an individual receives a message from an application associated with a service hosted on a server device using the user device (e.g., an A2P message), and/or the like. For example, the messaging gateway device may receive a message from a user device when a user of the user device sends a SMS message replying to a verification code from an organization that sent the verification code from an application associated with a service hosted on the server device. For implementation 100 assume, for example, that the message from the user device is either a P2A message or a P2P message based on being sent from the user device.

As shown by reference number 120, the messaging gateway device may send, to the server device, a request for classification information that identifies a classification of the message. For example, the request may include a search request for a classification of the MDN of the destination to which the message is destined and/or of the user device from which the message was received. In some implementations, the request for the classification may include a request for providing metadata associated with the message to the server device to facilitate classification of the message. For example, the request may include the source information and/or the destination information associated with the message and a set of instructions to cause the server device to perform a search of the classification using the source information and/or the destination information. In some implementations, the messaging gateway device may send the request automatically based on receiving the message, after storing the message for a threshold amount of time, based on a pre-defined schedule, and/or the like.

As shown by reference number 130, the messaging gateway device may receive, from the server device, a response message to the request for the classification information. In some implementations, the response message may include classification information that identifies the classification of the message, metadata to be attached to the message or to be sent separately from the message, and/or the like. In some implementations, the classification information may identify the message as an A2P message, a P2A message, a P2P message, and/or the like. For implementation 100 assume, for example, that the classification information identifies the message as either a P2A message or as a P2P message.

In some implementations, the classification may be based on the server device matching the source information and/or the destination information and an identifier included in a data structure that identifies a device and/or an application that sent the message, that is to receive the message, and/or the like. For example, the server device may match a MDN of a user device that sent the message or that is to receive the message, an application identifier that sent the message or that is to receive the message, and/or the like and the MDN, the application identifier, and/or the like stored in a data structure. Additionally, or alternatively, the classification may be based on the server device failing to match source information and/or destination information to information included in a data structure. For example, the data structure may only include application identifiers for applications, and failing to match source information and/or destination information to the application identifiers in the data structure may cause the server device to classify the message as a P2P message.

In some implementations, the messaging gateway device, rather than the server device, may perform the search. For example, the messaging gateway device may store information to be used to determine a classification of a message. This reduces or eliminates a need for the messaging gateway device to send a request for classification of the message to the server device, thereby conserving processing resources of the messaging gateway device, conserving network resources (e.g., bandwidth) of a network, and/or the like.

As shown by reference number 140, the messaging gateway device may dynamically provide the message to a channel based on the classification identified by the classification information. In some implementations, the messaging gateway device may provide the message to the inter-carrier server device, which may provide the message to a channel. In some implementations, the messaging gateway device may tag the message as an A2P message, a P2A message, or a P2P message, prior to providing the message to the inter-carrier server device, to indicate to the inter-carrier server device the channel via which the message is to be sent. Additionally, or alternatively, the messaging gateway device may send a set of instructions to the inter-carrier server device directing the inter-carrier server device to send the message via a particular channel.

In some implementations, the messaging gateway device may provide the message automatically based on receiving the response message, after storing the response message for an amount of time, and/or the like. In some implementations, the channel may be an A2P channel, a P2P channel, a P2A channel, and/or the like. For example, an A2P channel may be used for A2P messages, a P2A channel may be used for P2A messages, a P2P channel may be used for P2P messages, and/or the like. In some implementations, different channels may be configured with different filtering mechanisms for types of messages associated with the different channels. For example, an A2P channel or a P2A channel may be configured to permit hundreds, thousands, or more messages from a single source (e.g., an application for A2P messages), or to a single destination (e.g., the application for P2A messages).

As shown by reference number 150, the inter-carrier server device may provide the message to a destination via the channel. In some implementations, the inter-carrier server device may provide the message automatically based on receiving the message from the messaging gateway device, after storing the message for a threshold amount of time, and/or the like. In some implementations, the destination may be another user device (e.g., for a P2P message), storage location, an application (e.g., for a P2A message), and/or the like. In some implementations, if the message was originally sent by an application rather than the user device, then the inter-carrier server device may provide the message to an application.

As shown by reference number 160, the inter-carrier server device may provide the message to the destination via a communication interface and a P2A channel. In some implementations, the P2A channel may include spam filtering mechanisms. For example, the spam filtering mechanisms may be configured to permit P2A messages in scenarios when other spam filtering mechanisms would have filtered P2A messages as spam.

Alternatively, as shown by reference number 170, the inter-carrier server device may provide the message to the destination via the communication interface and a P2P channel. In some implementations, the P2P channel may include spam filtering mechanisms. For example, the spam filtering mechanisms may be configured to permit the P2P messages in scenarios when other span filtering mechanisms would have filtered the P2P messages as spam. In some implementations, the messaging gateway device, rather than the inter-carrier server device, may provide the message to the destination in the manner described herein.

In some implementations, the inter-carrier server device may perform one or more services related to providing the message to the destination. For example, the inter-carrier server device may monitor a quantity of particular types of messages sent for billing purposes. For example, the inter-carrier server device may monitor the quantity of messages sent via the P2A channel, an A2P channel, the P2P channel, and/or the like, and may bill different types of messages differently. Additionally, or alternatively, different services can be applied to different channels, such as enhanced services. For example, Rich Communication Services (RCS) can be applied to particular types of messages based on classification information.

In this way, some implementations described herein may facilitate improved understanding about types of messages that are being sent over a network, thereby facilitating enhanced billing, improved services, and/or the like. In addition, some implementations may allow for implementation of RCS, thereby improving messaging via a network. Further, some implementations may facilitate differentiation of P2P messages, P2A messages, and A2P messages from each other, thereby facilitating application of different spam filtering controls for different types of messages. Further, some implementations may reduce or eliminate errors in filtering messages as spam, thereby ensuring proper delivery as well as conserving computing resources that would otherwise be consumed erroneously filtering messages, that would otherwise be consumed sending additional messages to rectify erroneous filtering, and/or the like.

As indicated above, FIG. 1 is provided merely as an example. Other examples are possible and can differ from what was described with regard to FIG. 1. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of implementation 100 may perform one or more functions described as being performed by another set of devices of implementation 100.

Figure 2:
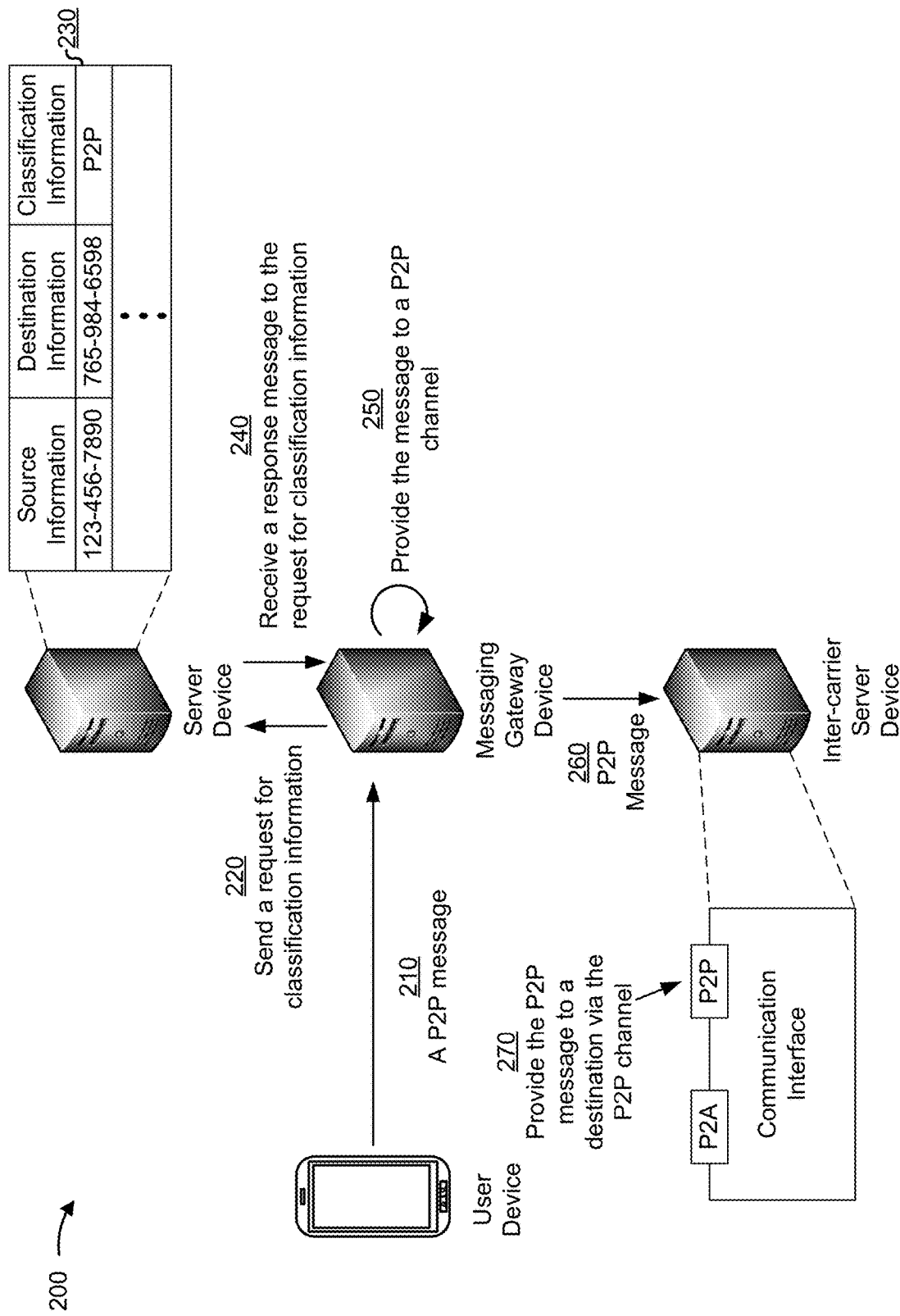
FIG. 2 is a diagram of an example implementation relating to person-to-person (P2P) messaging described herein.

FIG. 2 is a diagram of an example implementation 200 described herein. As shown in FIG. 2, implementation 200 includes a user device, a server device, a messaging gateway device, and an inter-carrier server device. FIG. 2 shows an example of classifying a message as a P2P message.

As shown in FIG. 2, and by reference number 210, the messaging gateway device may receive a P2P message from a user device. For example, the messaging gateway device may receive the P2P message in a manner that is the same as or similar to that described with regard to FIG. 1. As shown by reference number 220, the messaging gateway device may send, to the server device, a request for classification information that identifies a classification of the P2P message. For example, the messaging gateway device may send a request in a manner that is the same as or similar to that described with regard to FIG. 1.

As shown by reference number 230, the server device may perform a search to identify the classification information. For example, the server device may perform a search of source information and/or destination information associated with the P2P message to identify a classification of the P2P message. Continuing with the previous example, the server device may perform the search in a data structure that includes source information and/or destination information, classification information associated with the source information and/or the destination information, and/or the like. For example, the server device may perform a search of an MDN associated with a source of the message, an MDN associated with a destination of the message, and/or the like to identify the classification information.

As shown by reference number 240, the messaging gateway device may receive a response message to the request for the classification information. For example, the messaging gateway device may receive the response message in a manner that is the same as or similar to that described elsewhere herein. In some implementations, the response message may include information that identifies the P2P message as a P2P message. As shown by reference number 250, the messaging gateway device may provide the P2P message to a P2P channel based on the classification information classifying the P2P message as a P2P message. For example, the messaging gateway device may provide the P2P message to the P2P channel in a manner that is the same as or similar to that described elsewhere herein.

As shown by reference number 260, the messaging gateway device may provide the P2P message to the inter-carrier server device so that the inter-carrier server device can provide the P2P message to the P2P channel. For example, the messaging gateway device may provide the P2P message in a manner that is the same as or similar to that described elsewhere herein. As shown by reference number 270, the inter-carrier server device may provide the P2P message to a destination via the communication interface and the P2P channel. For example, the inter-carrier server device may provide the P2P message to another user device so that the P2P message can be delivered to a user of the other user device. In some implementations, the messaging gateway device, rather than the inter-carrier server device, may provide the message to a destination via the communication interface and the P2P channel.

As indicated above, FIG. 2 is provided merely as an example. Other examples are possible and can differ from what was described with regard to FIG. 2. The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of implementation 200 may perform one or more functions described as being performed by another set of devices of implementation 200.

Figure 3:
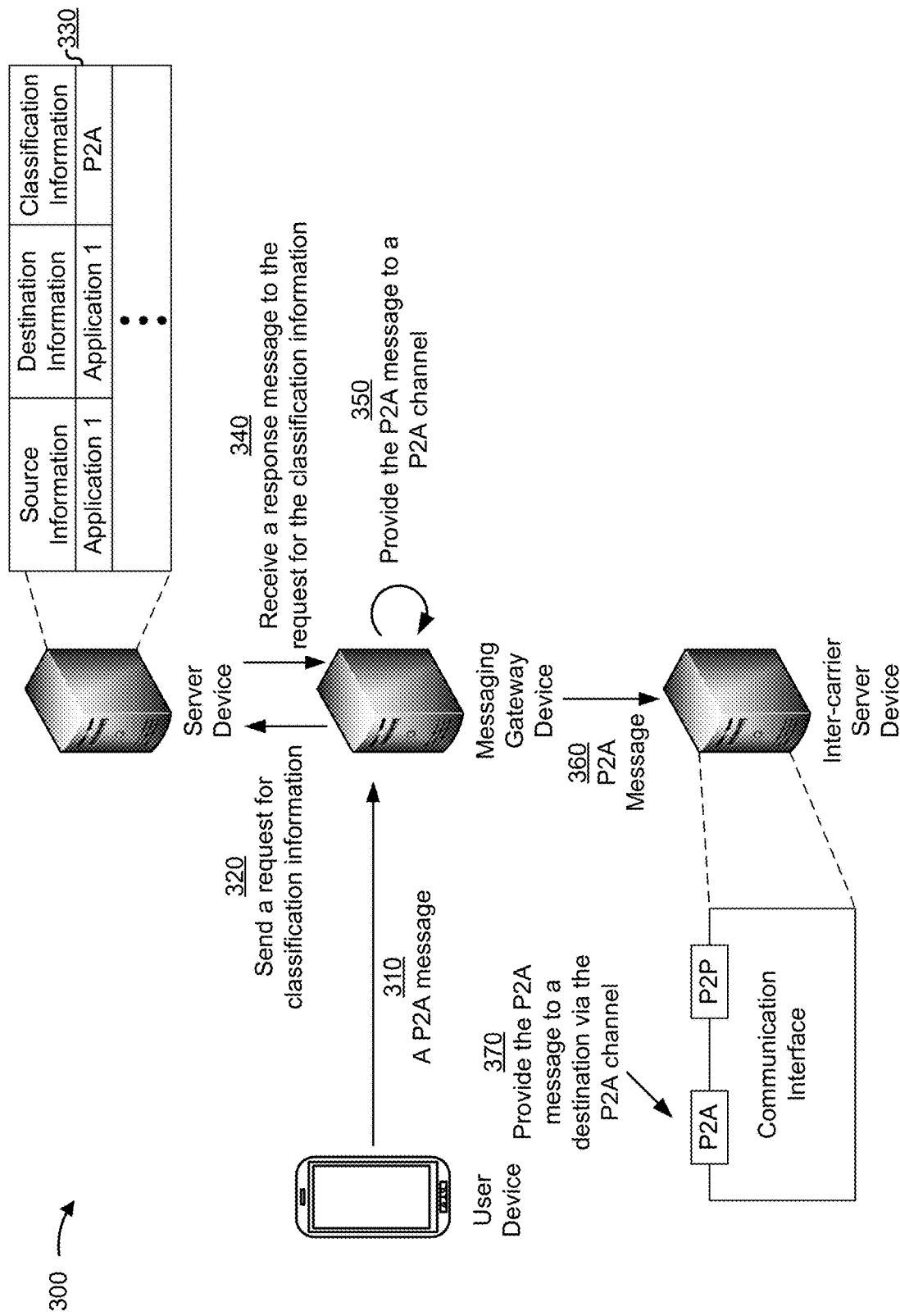
FIG. 3 is a diagram of an example implementation relating to application-to-person (A2P) messaging described herein.

FIG. 3 is a diagram of an example implementation 300 described herein. As shown in FIG. 3, implementation 300 includes a user device, a server device, a messaging gateway device, and an inter-carrier server device. FIG. 3 shows an example of classifying a message as an A2P message.

As shown in FIG. 3, and by reference number 310, the messaging gateway device may receive a P2A message from a user device. For example, the messaging gateway device may receive the P2A message in a manner that is the same as or similar to that described elsewhere herein. As shown by reference number 320, the messaging gateway device may send, to the server device, a request for classification information that identifies a classification of the P2A message. For example, the messaging gateway device may send the request in a manner that is the same as or similar to that described elsewhere herein.

As shown by reference number 330, the server device may perform a search to identify the classification information. For example, the server device may perform a search of source information and/or destination information associated with the P2A message. In some implementations, performing the search may include performing a search of an MDN associated with a source of the P2A message, an application identifier associated with a destination of the P2A message, and/or the like.

As shown by reference number 340, the messaging gateway device may receive a response message to the request for the classification information. For example, the messaging gateway device may receive a response message that includes the classification information identifying the P2A message as a P2A message, in a manner that is the same as or similar to that described elsewhere herein. As shown by reference number 350, the messaging gateway device may provide the P2A message to a P2A channel based on the classification information. For example, the messaging gateway server device may provide the P2A message in a manner that is the same as or similar to that described elsewhere herein.

As shown by reference 360, the messaging gateway server device may provide the P2A message to the inter-carrier server device so that the inter-carrier server device can provide the P2A message to the P2A channel. For example, the messaging gateway server device may provide the P2A message in a manner that is the same as or similar to that described elsewhere herein. As shown by reference number 370, the inter-carrier server device may provide the P2A message to a destination via the communication interface and the P2A channel. For example, the inter-carrier server device may provide the P2A message to an application in a manner that is the same as or similar to that described elsewhere herein.

As indicated above, FIG. 3 is provided merely as an example. Other examples are possible and can differ from what was described with regard to FIG. 3. The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of implementation 300 may perform one or more functions described as being performed by another set of devices of implementation 300.

Figure 4:
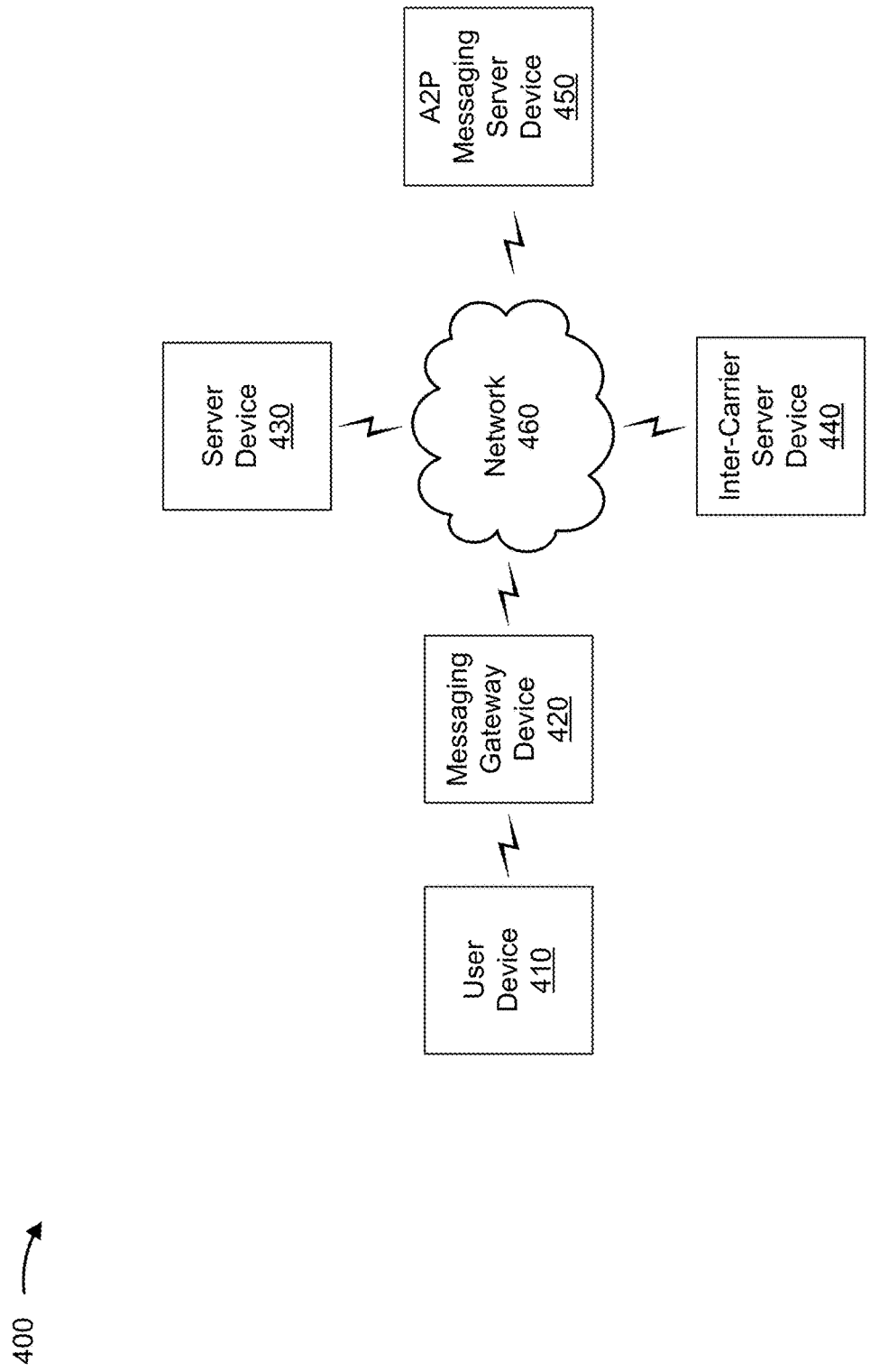
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a messaging gateway device 420, a server device 430, an inter-carrier server device 440, an A2P messaging server device 450, and a network 460. Devices of environment 400 may interconnect via wired connections, wireless connections, or a combination of wired and wireless connections.

User device 410 includes one or more devices capable of receiving, generating, storing, processing, and/or providing information associated with a message. For example, user device 410 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 410 may send a message to the messaging gateway device (e.g., a P2A message, a P2P message, and/or the like), as described elsewhere herein. In some implementations, an A2P messaging server may send a message to user device 410, as described elsewhere herein.

Messaging gateway device 420 includes one or more devices capable of receiving, generating, storing, processing, and/or providing information associated with a message. For example, messaging gateway device 420 may include a server (e.g., in a data center or a cloud computing environment), a data center (e.g., a multi-server micro data center), a workstation computer, or a similar type of device. In some implementations, messaging gateway device 420 may send a request for classification information to server device 430, as described elsewhere herein. In some implementations, messaging gateway device 420 may receive a response message to the request for the classification information, as described elsewhere herein. Additionally, or alternatively, messaging gateway device 420 may dynamically provide the message to a channel based on the classification identified by the classification information, as described elsewhere herein.

Server device 430 includes one or more devices capable of storing, processing, and/or routing information associated with a message. For example, server device 430 may include a server (e.g., in a data center or a cloud computing environment), a data center (e.g., a multi-server micro data center), a workstation computer, a virtual machine (VM) provided in a cloud computing environment, a short message service center (SMSC), a multimedia messaging service center (MMSC), a simple mail transfer protocol (SMTP) gateway, or a similar type of device. In some implementations, server device 430 may include a communication interface that allows server device 430 to receive information from and/or transmit information to other devices in environment 400. In some implementations, server device 430 may receive a request for classification information from messaging gateway device 420, and may provide a response message, which includes the classification information, to messaging gateway device 420, as described elsewhere herein.

Inter-carrier server device 440 includes one or more devices capable of receiving, generating, storing, processing, and/or providing information associated with a message. For example, inter-carrier server device 440 may include a server (e.g., in a data center or a cloud computing environment), a data center (e.g., a multi-server micro data center, a virtual machine (VM) provided in a cloud computing environment, an SMSC, an MMSC, an SMTP gateway, or a similar type of device. In some implementations, inter-carrier server device 440 may receive a message from messaging gateway device 420, as described elsewhere herein. Additionally, or alternatively, inter-carrier server device 440 may dynamically provide a message to a channel based on a classification of the message identified by classification information, as described elsewhere herein. Additionally, or alternatively, inter-carrier server device 440 may determine a destination of the message and may provide the message to the destination, as described elsewhere herein. In some implementations, inter-carrier server device 440 may be associated with a carrier different than server device 430 (e.g., inter-carrier server device 440 may provide connectivity between two or more networks), as described elsewhere herein.

A2P messaging server device 450 includes one or more devices capable of storing, processing, and/or routing information associated with a message. For example, A2P messaging server device 450 may include a server (e.g., in a data center or a cloud computing environment), a data center (e.g., a multi-server micro data center), a workstation computer, a virtual machine (VM) provided in a cloud computing environment, or a similar type of device. In some implementations, A2P messaging server device 450 may send, to user device 410, an A2P message associated with an application, a service, and/or the like, as described in more detail elsewhere herein.

Network 460 includes one or more wired and/or wireless networks. For example, network 460 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
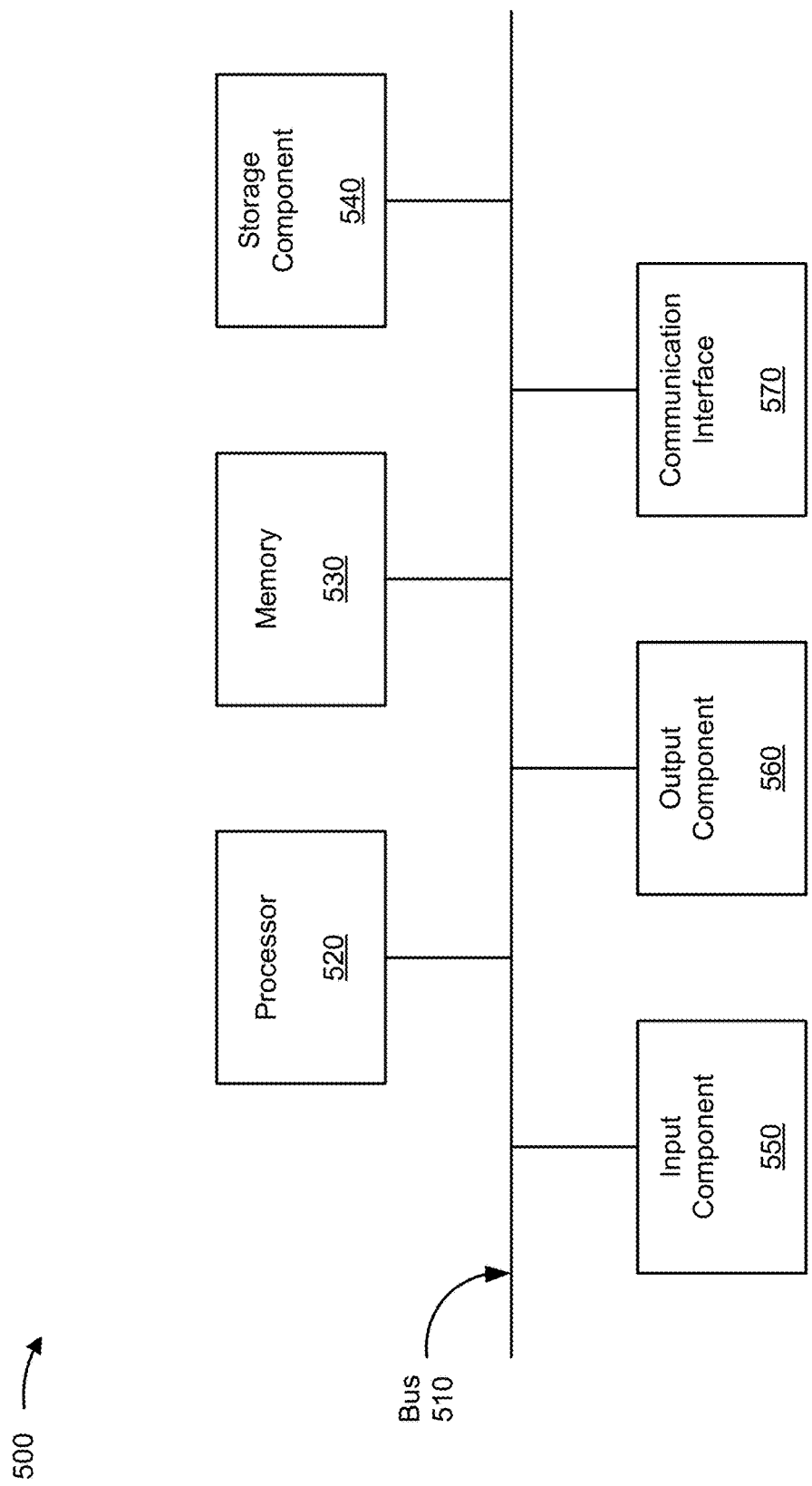
FIG. 5 is a diagram of example components of one or more devices of FIG. 4.

FIG. 5 is a diagram of example components of a device 500. Device 500 may correspond to user device 410, messaging gateway device 420, server device 430, inter-carrier server device 440, and/or A2P messaging server device 450. In some implementations, user device 410, messaging gateway device 420, server device 430, inter-carrier server device 440, and/or A2P messaging server device 450 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a wireless local area network interface, a cellular network interface, or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flow chart of an example process 600 for classifying and/or transmitting messages. In some implementations, one or more process blocks of FIG. 6 may be performed by a messaging gateway device (e.g., messaging gateway device 420). In some implementations, one or more process blocks of FIG. 6 may be performed by another device or a group of devices separate from or including the messaging gateway device, such as a user device (e.g., user device 410), a server device (e.g., server device 430), an inter-carrier server device (e.g., inter-carrier server device 440) and an A2P messaging server device (e.g., A2P messaging server device 450).

As shown in FIG. 6, process 600 may include receiving a message from a source, wherein the message includes at least one of: source information that identifies the source of the message, or destination information that identifies a destination of the message (block 610). For example, the messaging gateway device (e.g., messaging gateway device 420 using processor 520, input component 550, communication interface 570, and/or the like) may receive a message from a source, in a manner that is the same or similar to that described above in connection with FIGS. 1-3. In some implementations, the message may include at least one of source information that identifies the source of the message or destination information that identifies a destination of the message.

As further shown in FIG. 6, process 600 may include sending, to a server device, a request for classification information that identifies a classification of the message after receiving the message, wherein the request includes the at least one of the source information or the destination information included in the message, wherein the classification is based on the at least one of the source information or the destination information included in the message (block 620). For example, the messaging gateway device (e.g., messaging gateway device 420 using processor 520, output component 560, communication interface 570, and/or the like) may send, to a server device, a request for classification information that identifies a classification of the message after receiving the message, in a manner that is the same or similar to that described above in connection with FIGS. 1-3. In some implementations, the request may include the at least one of the source information or the destination information included in the message. In some implementations, the classification may be based on the at least one of the source information or the destination information included in the message.

As further shown in FIG. 6, process 600 may include receiving a response message to the request for the classification information after sending the request, wherein the response message includes the classification information identifying the classification (block 630). For example, the messaging gateway device (e.g., messaging gateway device 420 using processor 520, input component 550, communication interface 570, and/or the like) may receive a response message to the request for the classification information after sending the request, in a manner that is the same or similar to that described above in connection with FIGS. 1-3. In some implementations, the response message may include the classification information identifying the classification.

As further shown in FIG. 6, process 600 may include dynamically providing the message to a channel based on the classification identified by the classification information after receiving the response message, wherein the channel is associated with the classification (block 640). For example, the messaging gateway device (e.g., messaging gateway device 420 using processor 520, output component 560, communication interface 570, and/or the like) may dynamically provide the message to a channel based on the classification identified by the classification information after receiving the response message, in a manner that is the same or similar to that described above in connection with FIGS. 1-3. In some implementations, the channel may be associated with the classification.

Process 600 may include additional implementations, such as any single implementation or any combination of implementations described below and/or in connection with one or more other processes described elsewhere herein.

In some implementations, the messaging gateway device may receive the message directly from the source, or may receive the message via an inter-carrier server device. In some implementations, the message may be at least one of an application-to-person (A2P) message, a person-to-application (P2A) message, or a person-to-person (P2P) message.

In some implementations, the messaging gateway device may dynamically provide the message to a first channel or to a second channel based on the classification identified by the classification information, wherein the first channel is different than the second channel. In some implementations, the channel may include a filtering mechanism to direct the message to the destination, wherein the destination may include at least one of: an application, or a user device associated with an individual. In some implementations, the source information or the destination information may include a mobile directory number (MDN) of at least one of the source of the message or the destination of the message, an international mobile subscriber identifier (IMSI) of the at least one of the source of the message or the destination of the message, a universally unique identifier of the at least one of the source of the message or the destination of the message, or an application identifier of the at least one of the source of the message or the destination of the message.

In some implementations, the messaging gateway device may dynamically provide a set of instructions to an inter-carrier server device in association with providing the message, wherein the set of instructions may be associated with causing the inter-carrier server device to send the message to the destination via the channel.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for classifying and/or transmitting messages. In some implementations, one or more process blocks of FIG. 7 may be performed by a messaging gateway device (e.g., messaging gateway device 420). In some implementations, one or more process blocks of FIG. 7 may be performed by another device or a group of devices separate from or including the messaging gateway device, such as a user device (e.g., user device 410), a server device (e.g., server device 430), an inter-carrier server device (e.g., inter-carrier server device 440), and an A2P messaging server device (e.g., A2P messaging server device 450).

As shown in FIG. 7, process 700 may include receiving a message from a source, wherein the message is at least one of a first type of message wherein the source of the message or a destination of the message includes an application, or a second type of message wherein both the source of the message and the destination of the message include a user device associated with an individual, wherein the message includes at least one of: source information that identifies the source of the message, or destination information that identifies the destination of the message (block 710). For example, the messaging gateway device (e.g., messaging gateway device 420 using processor 520, input component 550, communication interface 570, and/or the like) may receive a message from a source, in a manner that is the same or similar to that described above in connection with FIGS. 1-3. In some implementations, the message may include at least one of a first type of message wherein the source of the message or a destination of the message includes an application, or a second type of message wherein both the source of the message and the destination of the message include a user device associated with an individual. In some implementations, the message may include at least one of: source information that identifies the source of the message, or destination information that identifies the destination of the message.

As further shown in FIG. 7, process 700 may include sending a request for classification information that identifies a classification of the message after receiving the message, wherein the request includes the at least one of the source information or the destination information included in the message, wherein the classification is based on the at least one of the source information or the destination information included in the message, wherein the classification identifies the message as the first type of message or the second type of message (block 720). For example, the messaging gateway device (e.g., messaging gateway device 420 using processor 520, output component 560, communication interface 570, and/or the like) may send a request for classification information that identifies a classification of the message after receiving the message, in a manner that is the same or similar to that described above in connection with FIGS. 1-3. In some implementations, the request may include the at least one of the source information or the destination information included in the message. In some implementations, the classification may be based on the at least one of the source information or the destination information included in the message. In some implementations, the classification may identify the message as the first type of message or the second type of message.

As further shown in FIG. 7, process 700 may include receiving a response message to the request for classification information after sending the request, wherein the response message includes the classification information identifying the classification of the message (block 730). For example, the messaging gateway device (e.g., messaging gateway device 420 using processor 520, input component 550, communication interface 570, and/or the like) may receive a response message to the request for the classification information after sending the request, in a manner that is the same or similar to that described above in connection with FIGS. 1-3. In some implementations, the response message may include the classification information identifying the classification of the message.

As further shown in FIG. 7, process 700 may include determining a channel via which to provide the message based on the classification identified by the classification information after receiving the response message, wherein the channel is associated with the classification (block 740). For example, the messaging gateway device (e.g., messaging gateway device 420 using processor 520, memory 530, storage component 540, and/or the like) may determine a channel via which to provide the message based on the classification identified by the classification information after receiving the response message, in a manner that is the same or similar to that described above in connection with FIGS. 1-3. In some implementations, the channel may be associated with the classification.

As further shown in FIG. 7, process 700 may include providing the message to the channel after determining the channel (block 750). For example, the messaging gateway device (e.g., messaging gateway device 420 using processor 520, output component 560, communication interface 570, and/or the like) may provide the message to the channel after determining the channel, in a manner that is the same or similar to that described above in connection with FIGS. 1-3.

Process 700 may include additional implementations, such as any single implementation or any combination of implementations described below and/or in connection with one or more other processes described elsewhere herein.

In some implementations, the messaging gateway device may identify the classification of the message as the first type of message or the second type of message based on the classification information included in the response message, and may provide the message after identifying the classification of the message. In some implementations, the messaging gateway device may receive the message directly from the user device, or may receive the message via an inter-carrier server device. In some implementations, the messaging gateway device may provide a set of instructions to an inter-carrier server device in association with providing the message, wherein the set of instructions is associated with causing the inter-carrier server device to send the message to the destination via a first channel for the first type of message, or via a second channel for the second type of message.

In some implementations, the messaging gateway device may provide the message to a first channel or a second channel based on the classification identified by the classification information, wherein the first channel is different than the second channel. In some implementations, the messaging gateway device may determine the channel as a first type of channel based on the classification information indicating that the source or the destination of the message is the application, and may dynamically provide the message via the first type of channel after determining the channel as the first type of channel. In some implementations, the channel comprises a filtering mechanism to direct the message to the destination based on the classification information that identifies the classification of the message.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flow chart of an example process 800 for classifying and/or transmitting messages. In some implementations, one or more process blocks of FIG. 8 may be performed by a messaging gateway device (e.g., messaging gateway device 420). In some implementations, one or more process blocks of FIG. 8 may be performed by another device or a group of devices separate from or including the messaging gateway device, such as a user device (e.g., user device 410), a server device (e.g., server device 430), an inter-carrier server device (e.g., inter-carrier server device 440), and an A2P messaging server device (e.g., A2P messaging server device 450).

As shown in FIG. 8, process 800 may include receiving a message from a source, wherein the message is at least one of: a first type of message wherein at least one of the source of the message or a destination of the message includes an application, or a second type of message wherein both the source of the message and the destination of the message include a user device associated with an individual, wherein the message includes source information that identifies the source of the message or destination information that identifies the destination of the message (block 810). For example, the messaging gateway device (e.g., messaging gateway device 420 using processor 520, input component 550, communication interface 570, and/or the like) may receive a message from a source, in a manner that is the same or similar to that described above in connection with FIGS. 1-3. In some implementations, the message may be at least one of a first type of message wherein at least one of the source of the message or a destination of the message includes an application, or a second type of message wherein both the source of the message and the destination of the message include a user device associated with an individual. In some implementations, the message may include source information that identifies the source of the message or destination information that identifies the destination of the message.

As further shown in FIG. 8, process 800 may include performing a search of classification information that identifies a classification of the message in a data structure after receiving the message, wherein the data structure includes at least one of: aggregated source information for multiple sources of messages and aggregated classification information for the multiple sources, or aggregated destination information for multiple destinations of messages and aggregated classification information for the multiple destinations, wherein the classification is based on the source information or the destination information included in the message, wherein the classification information identifies the message as the first type of message or the second type of message (block 820). For example, the messaging gateway device (e.g., messaging gateway device 420 using processor 520, memory 530, storage component 540, and/or the like) may perform a search of classification information that identifies a classification of the message in a data structure after receiving the message, in a manner that is the same or similar to that described above in connection with FIGS. 1-3. In some implementations, the data structure may include at least one of aggregated source information for multiple sources of messages and aggregated classification information for the multiple sources, or aggregated destination information for multiple destinations of messages and aggregated classification information for the multiple destinations. In some implementations, the classification may be based on the source information or the destination information included in the message. In some implementations, the classification information may identify the message as the first type of message or the second type of message.

As further shown in FIG. 8, process 800 may include determining a channel via which to provide the message based on the classification information identified by performing the search, wherein the channel is at least one of: a first type of channel for the first type of message, or a second type of channel for the second type of message (block 830). For example, the messaging gateway device (e.g., messaging gateway device 420 using processor 520, memory 530, storage component 540, and/or the like) may determine a channel via which to provide the message based on the classification information identified by performing the search, in a manner that is the same or similar to that described above in connection with FIG. 1-3. In some implementations, the channel may be at least one of a first type of channel for the first type of message, or a second type of channel for the second type of message.

As further shown in FIG. 8, process 800 may include dynamically providing the message to the first type of channel or the second type of channel after determining the channel (block 840). For example, the messaging gateway device (e.g., messaging gateway device 420 using processor 520, output component 560, communication interface 570, and/or the like) may dynamically provide the message to the first type of channel or the second type of channel after determining the channel in a manner that is the same or similar to that described above in connection with FIGS. 1-3.

Process 800 may include additional implementations, such as any single implementation or any combination of implementations described below and/or in connection with one or more other processes described elsewhere herein.

In some implementations, the first type of message may be identified as an application-to-person (A2P) message or a person-to-application (P2A) message and the second type of message may be identified as a person-to-person (P2P) message. In some implementations, the messaging gateway device may receive the message directly from the user device or via an inter-carrier server device, wherein the message is destined for at least one of: the application, or the user device.

In some implementations, the messaging gateway device may determine the channel as the first type of channel based on a result of the search indicating that the source or the destination of the message is the application, and may dynamically provide the message via the first type of channel after determining the channel as the first type of channel. In some implementations, the messaging gateway device may determine the channel as the second type of channel based on a result of the search indicating that the source of the message is a first user device associated with a first user and that the destination of the message is a second user device associated with a second user, and may dynamically provide the message via the second type of channel after determining the channel as the second type of channel.

In some implementations, the messaging gateway device may dynamically provide a set of instructions to an inter-carrier server device in association with providing the message, wherein the set of instructions is associated with causing the inter-carrier server device to provide the message to the destination via the first type of channel for the first type of message, or via the second type of channel for the second type of message.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In this way, the messaging gateway device may determine a classification of a message and may dynamically provide the message to a channel associated with the classification (e.g., where the channel is configured messages associated with the classification). This reduces or eliminates erroneous filtering of messages by providing different types of messages to channels that include filtering mechanisms specific to different types of messages. In addition, this conserves processing resources that would otherwise be consumed via erroneous filtering of messages. Further, this provides a way for a network to distinguish between different types of messages within the network, thereby facilitating provisioning of different types of services to the different types of messages.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a message from a source,
        wherein the message includes at least one of:
            source information that identifies the source of the message, or
            destination information that identifies a destination of the message;
    sending, by the device and to a server device, a request for classification information that identifies a classification of the message after receiving the message,
        wherein the request includes the at least one of the source information or the destination information included in the message,
        wherein the classification is based on the at least one of the source information or the destination information included in the message, and
        wherein the classification is one of:
            an application-to-person (A2P) message classification,
            a person-to-application (P2A) message classification, or
            a person-to-person (P2P) message classification;
    receiving, by the device, a response message to the request for the classification information after sending the request,
        wherein the response message includes the classification information identifying the classification;
    dynamically providing, by the device, the message to a channel, of a plurality of channels, based on the classification identified by the classification information after receiving the response message,
        wherein the channel is associated with the classification, and
        wherein the plurality of channels includes:
            an A2P channel for A2P messages,
            a P2A channel for P2A messages, and
            a P2P channel for P2P messages; and
    monitoring one or more messages of the A2P channel, the P2A channel, and the P2P channel,
        wherein Rich Communication Services (RCS) are applied to the one or more messages.

2. The method of claim 1, wherein receiving the message comprises:
    receiving the message directly from the source, or receiving the message via an inter-carrier server device.

3. The method of claim 1, wherein dynamically providing the message comprises:
    dynamically providing the message to a first channel or to a second channel based on the classification identified by the classification information,
        wherein the first channel is different than the second channel.

4. The method of claim 1, wherein the channel comprises a filtering mechanism to direct the message to the destination,
    wherein the destination includes at least one of:
        an application, or
        a user device associated with an individual.

5. The method of claim 1, wherein the source information or the destination information comprises:
    a mobile directory number (MDN) of at least one of the source of the message or the destination of the message,
    an international mobile subscriber identifier (IMSI) of the at least one of the source of the message or the destination of the message,
    a universally unique identifier of the at least one of the source of the message or the destination of the message, or
    an application identifier of the at least one of the source of the message or the destination of the message.

6. The method of claim 1, wherein dynamically providing the message comprises:
    dynamically providing a set of instructions to an inter-carrier server device in association with providing the message,
        wherein the set of instructions is associated with causing the inter-carrier server device to send the message to the destination via the channel.

7. A device, comprising:
    one or more memories; and
    one or more processors, communicatively coupled to the one or more memories, to:
        receive a message from a source,
            wherein the message is at least one of:
                a first type of message wherein the source of the message or a destination of the message includes an application, or
                a second type of message wherein both the source of the message and the destination of the message include a user device associated with an individual,
            wherein the message includes at least one of:
                source information that identifies the source of the message, or
                destination information that identifies the destination of the message;

send a request for classification information that identifies a classification of the message after receiving the message,
wherein the request includes the at least one of the source information or the destination information included in the message,
wherein the classification is based on the at least one of the source information or the destination information included in the message,
wherein the classification identifies the message as the first type of message or the second type of message, and
wherein the classification is one of:
an application-to-person (A2P) message classification,
a person-to-application (P2A) message classification, or
a person-to-person (P2P) message classification;
receive a response message to the request for the classification information after sending the request,
wherein the response message includes the classification information identifying the classification of the message;
determine a channel, of a plurality of channels, via which to provide the message based on the classification identified by the classification information after receiving the response message,
wherein the channel is associated with the classification, and
wherein the plurality of channels includes:
an A2P channel for A2P messages,
a P2A channel for P2A messages, and
a P2P channel for P2P messages;
provide the message to the channel after determining the channel; and
monitor one or more messages of the A2P channel, the P2A channel, and the P2P channel,
wherein Rich Communication Services (RCS) are applied to the one or more messages.

8. The device of claim 7, wherein the one or more processors are further to:
identify the classification of the message as one of the A2P message classification, P2A message classification, or P2P message classification based on the classification information included in the response message; and
wherein the one or more processors, when providing the message, are to:
provide the message after identifying the classification of the message.

9. The device of claim 7, wherein the one or more processors, when receiving the message, are to:
receive the message directly from the user device, or receive the message via an inter-carrier server device.

10. The device of claim 7, wherein the one or more processors, wherein providing the message, are to:
provide a set of instructions to an inter-carrier server device in association with providing the message,
wherein the set of instructions is associated with causing the inter-carrier server device to send the message to the destination via the A2P channel for an A2P message, the P2P channel for a P2P message, or a P2A channel for a P2A message.

11. The device of claim 7, wherein the one or more processors, wherein providing the message, are to:
provide the message to the A2P channel, the P2P channel, or the P2A channel based on the classification identified by the classification information,
wherein the A2P channel is different than the P2A channel.

12. The device of claim 7, wherein the one or more processors, when determining the channel, are to:
determine the channel as the P2A channel based on the classification information indicating that the destination of the message is the application; and
wherein the one or more processors, when dynamically providing the message, are to:
dynamically provide the message via the P2A channel after determining the channel as the P2A channel.

13. The device of claim 7, wherein the channel comprises a filtering mechanism to direct the message to the destination based on the classification information that identifies the classification of the message.

14. A non-transitory computer-readable medium storing instructions, the instructions comprising:
one or more instructions that, when executed by one or more processors, cause the one or more processors to:
receive a message from a source,
wherein the message is at least one of:
a first type of message wherein at least one of the source of the message or a destination of the message includes an application, or
a second type of message wherein both the source of the message and the destination of the message include a user device associated with an individual,
wherein the message includes source information that identifies the source of the message or destination information that identifies the destination of the message;
perform a search of classification information that identifies a classification of the message in a data structure after receiving the message,
wherein the data structure includes at least one of:
aggregated source information for multiple sources of messages and aggregated classification information for the multiple sources, or
aggregated destination information for multiple destinations of messages and the aggregated classification information for the multiple destinations,
wherein the classification is based on the source information or the destination information included in the message,
wherein the classification information identifies the message as the first type of message or the second type of message, and
wherein the classification is one of:
an application-to-person (A2P) message classification,
a person-to-application (P2A) message classification, or
a person-to-person (P2P) message classification;
determine a channel, of a plurality of channels, via which to provide the message based on the classification information identified by performing the search,
wherein the plurality of channels includes:
an A2P channel for A2P messages,
a P2A channel for P2A messages, and
a P2P channel for P2P messages;

dynamically provide the message to the channel after determining the channel; and
monitor one or more messages of the A2P channel, the P2A channel, and the P2P channel,
wherein Rich Communication Services (RCS) are applied to the one or more messages.

15. The non-transitory computer-readable medium of claim 14, wherein the one or more instructions, that cause the one or more processors to receive the message, cause the one or more processors to:
receive the message directly from the user device or via an inter-carrier server device,
wherein the message is destined for at least one of:
the application, or
the user device.

16. The non-transitory computer-readable medium of claim 14, wherein the one or more instructions, that cause the one or more processors to determine the channel, cause the one or more processors to:
determine the channel as an A2P channel based on a result of the search indicating that the source of the message is the application; and
wherein the one or more instructions, that cause the one or more processors to dynamically provide the message, cause the one or more processors to:
dynamically provide the message via the A2P channel after determining the channel as the A2P.

17. The non-transitory computer-readable medium of claim 14, wherein the one or more instructions, that cause the one or more processors to determine the channel, cause the one or more processors to:
determine the channel as the P2P channel based on a result of the search indicating that the source of the message is a first user device associated with a first individual and that the destination of the message is a second user device associated with a second individual; and
wherein the one or more instructions, that cause the one or more processors to dynamically provide the message, cause the one or more processors to:
dynamically provide the message via the P2P channel after determining the channel as the P2P channel.

18. The non-transitory computer-readable medium of claim 14, wherein the one or more instructions, that cause the one or more processors to dynamically provide the message, cause the one or more processors to:
dynamically provide a set of instructions to an inter-carrier server device in association with providing the message,
wherein the set of instructions is associated with causing the inter-carrier server device to provide the message to the destination via A2P channel for the first type of message, or via the P2P channel for the second type of message.

19. The method of claim 1, further comprising:
tagging the message as an A2P message, a P2A message, or a P2P message, prior to providing the message to an inter-carrier server device, to indicate to the inter-carrier server device the channel via which the message is to be sent.

20. The non-transitory computer-readable medium of claim 14, wherein the one or more instructions, that cause the one or more processors to receive the message, cause the one or more processors to:
tag the message as an A2P message, a P2A message, or a P2P message, prior to providing the message to an inter-carrier server device, to indicate to the inter-carrier server device the channel via which the message is to be sent.

* * * * *